United States Patent
Gandham et al.

(10) Patent No.: US 8,355,373 B2
(45) Date of Patent: Jan. 15, 2013

(54) METHODOLOGY FOR BASE STATION ASSISTED CHANNEL SELECTION FOR INTERFERENCE HANDLING IN MOBILE NETWORKS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 376 days.

(21) Appl. No.: 12/583,644

(22) Filed: Aug. 24, 2009

(65) Prior Publication Data
US 2010/0091738 A1 Apr. 15, 2010

Related U.S. Application Data

(60) Provisional application No. 61/195,840, filed on Oct. 11, 2008.

(51) Int. Cl.
*H04W 4/00* (2009.01)
(52) U.S. Cl. ......... 370/329; 370/326; 370/331; 370/341
(58) Field of Classification Search .................... 370/331
See application file for complete search history.

(56) References Cited

U.S. PATENT DOCUMENTS

| | | | | |
|---|---|---|---|---|
| 6,594,252 | B1 * | 7/2003 | Barany et al. | 370/347 |
| 6,873,607 | B1 * | 3/2005 | Hamada et al. | 370/321 |
| 2005/0025182 | A1 * | 2/2005 | Nazari | 370/469 |
| 2006/0198337 | A1 * | 9/2006 | Hoang et al. | 370/329 |
| 2007/0161385 | A1 | 7/2007 | Anderson | |
| 2007/0248044 | A1 * | 10/2007 | Vogety et al. | 370/329 |
| 2008/0062933 | A1 * | 3/2008 | Liu et al. | 370/332 |
| 2008/0130618 | A1 * | 6/2008 | Kwon | 370/345 |

* cited by examiner

*Primary Examiner* — Derrick Ferris
*Assistant Examiner* — Kodzovi Acolaste
(74) *Attorney, Agent, or Firm* — Dennis L. Cook, Esq.

(57) ABSTRACT

A mechanism is disclosed where a Base Station provides assistance to a mobile device in the channel-switch process because a mobile device might have to perform frequent channel switches to overcome adverse channel conditions due to interference in the 900 MHz ISM band. The Base Station broadcasts channel-specific information that will be used by all mobile devices to accurately select prospective channels for future channel-switches, thereby cutting down the latency that is experienced during an actual switch.

1 Claim, 2 Drawing Sheets

METHODOLOGY FOR BASE STATION ASSISTED CHANNEL SELECTION FOR INTERFERENCE HANDLING IN MOBILE NETWORKS

CROSS-REFERENCE TO RELATED APPLICATION

The present application claims the benefit of previously filed co-pending Provisional Patent Application Ser. No. 61/195,840

FIELD OF THE INVENTION

This invention addresses the need to transport high bit-rate data and voice to multiple users over wired and wireless means. Specifically, a mechanism is proposed wherein the Base Station provides assistance to the mobile device in the channel-switch process. The Base Station broadcasts channel-specific information that will be used by all mobile devices to accurately select prospective channels for future channel-switches, thereby cutting down the latency that is experienced during an actual switch.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this mechanism wherein the Base Station provides assistance to the mobile device in the channel-switch process is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069,057; 12/070,0817; 12/380,698; 12/384,546; 12/386,648; 12,387,811; 12/387,807, 12/456,758, 12/456,725, 12/460,497, and 61/192,799 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a mechanism wherein the Base Station provides assistance to the mobile device in the channel-switch process in mobile IP telephony as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

Due to interference in the 900 MHz ISM band, a mobile device might have to perform frequent channel switches to overcome adverse channel conditions. A mechanism is disclosed in this application wherein the Base Station provides assistance to the mobile device in the channel-switch process. The Base Station broadcasts channel-specific information that will be used by all mobile devices to accurately select prospective channels for future channel-switches, thereby cutting down the latency that is experienced during an actual switch.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

For illustration purposes a multi channel xMAX system is used to explain this invention. The proposed method is applicable to other mobile systems that are well known by those skilled in the art. The multi channel xMAX system is susceptible to interference as it operates in the 900 MHz ISM band. This interference may be co-channel/adjacent-channel interference or it may be caused by non-xMAX sources. Proper system design and frequency planning will mitigate co-channel and adjacent channel interference. In this disclosure handling interference from non-xMAX systems is discussed. To overcome the interference, xMax devices (for example: mobile handsets and desktop modems) have to switch to un-affected channels. The decision to perform a switch should be based on accurate and recent channel conditions. Note that the channel conditions might be different at the base station and the mobile devices. A priori knowledge of channel conditions enables quick decision-making. The xMAX end user devices proactively scan other channels to estimate channel condition in the downlink. A mechanism is proposed where the Base Station assists the mobile devices by providing the uplink channel condition. This feedback, in conjunction with the information obtained through the scans, allows the mobile devices to select the best channels.

The Multi-frequency xMAX system operates in the 900 MHz Industrial Scientific and Medical (ISM) band over frequencies ranging from 902 MHz to 928 MHz. xMAX supports 18 1.44 MHz wide channels, each providing a maximum data rate of 1 Mbps. The coverage area of each xMAX cell is split into three 120-degree sectors, with a maximum of six channels servicing a sector. Each channel is split into multiple fixed duration timeslots that provide Uplink and Downlink Data/Control paths to end user devices. For a detailed explanation of the multi-frequency xMAX system refer to the previously filed applications identified above.

In a heterogeneous MAC protocol, the time domain is sliced into equal intervals of time referred to as a Super-frame. The duration of a Super-frame is dependent on the codec used. Each Super-frame is split into multiple fixed duration timeslots that provide Uplink and Downlink Data/Control paths to end user devices. Eighteen Super-frames combine to form a Hyper-frame.

Figure 1:
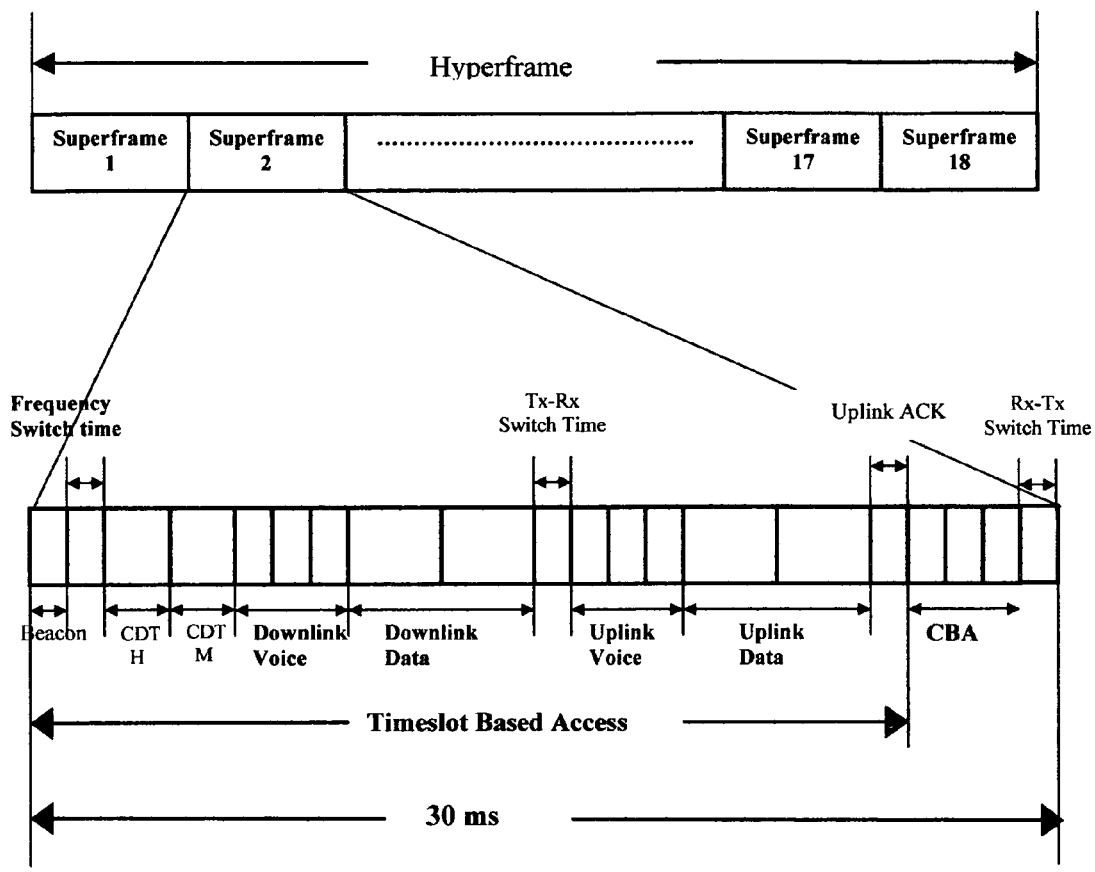
FIG. 1 is a diagram showing a Super-frame/Hyper-frame Structure.

FIG. 1 depicts the Super-frame structure and the relation between a Super-frame and a Hyper-frame. For a detailed explanation of Beacon and Super-frame structure, please refer to the previously filed applications identified above.

The Base Station is capable of estimating and calculating channel conditions as well as various other channel-specific factors on each channel it supports. This information can prove to be very useful for a mobile device in the event of a channel switch. To convey this information, the Base Station uses the Beacon that is sent at the beginning of every Super-frame on each channel.

At the start of every super-frame the base station transmits a beacon on all the channels (refer to FIG. 1). The Beacon is useful for maintaining timing synchronization between the Base Station and mobile devices. It also allows the mobile devices to perform frequency correction to keep the frequency in sync with the center frequency of the channel. The beacon of the preferred embodiment contains the following elements (refer to FIG. 2).

BTS ID: The 32-bit base station identifier allows the handset to recognize the sector, Base Station, and Dealer Network to which it is currently associated with. In addition the base station identifier allows the handset to determine whether the beacon corresponds to the current Base Station or neighboring Base Stations.

Super-frame and Hyper-frame number: The 32-bit super-frame and hyper-frame field is used by the handset to identify the position of the current super-frame in the hyper-frame. The most significant 16 bits correspond to the hyper-frame number and the least significant 16 bits correspond to the super-frame number.

Figure 2:
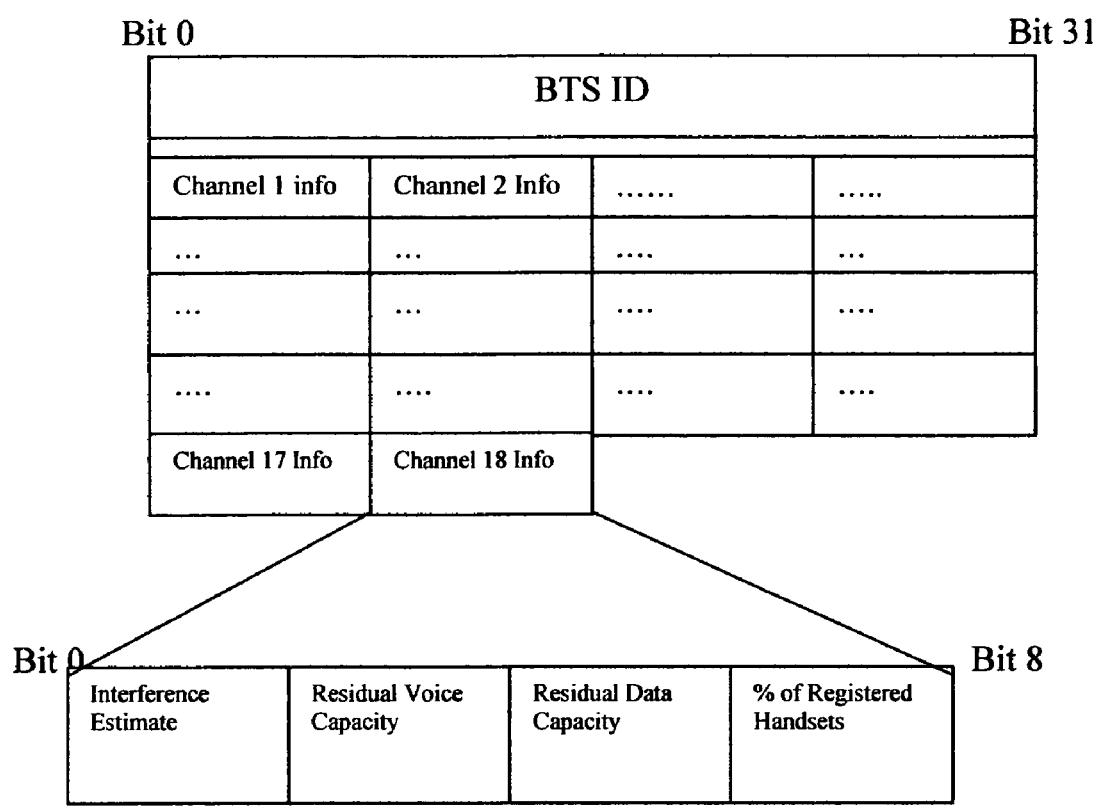
FIG. 2 is a diagram showing the Beacon Structure.

Channel Info: An 8-bit parameter is used to convey information about each channel. Refer to FIG. 2 for the details. The most significant 2 bits convey interference in the corresponding channel, the next 2 bits indicate the residual voice capacity in the corresponding channel, the following 2 bits indicate the residual data capacity in the corresponding channel, and the least significant 2 bits convey information about registration load on the base station in the corresponding channel. The following explains how the values of each of these fields are estimated.

Interference Estimate (2 bits): This is the estimate of interference observed on the uplink of a channel. The physical layer of the Base Station calculates this value for every packet received and conveys it to the MAC protocol. The mobile device can use this information to pick only those channels for scanning that are not affected by interference. Perceived interference is calculated by the base station as follows:

The base station maintains a running average of observed interference on a per-timeslot basis. If the average interference on a given timeslot exceeds a predefined threshold, the timeslot is categorized as unusable. The base station calculates the percentage of unusable timeslots per channel and provides this information to the handset in the beacon on a per channel basis. This is represented in the following table:

| Bit Combination | Residual Voice Capacity |
| --- | --- |
| 00 | 1% to 33% |
| 01 | 33% to 66% |
| 10 | 66% to 100% |
| 11 | 0 (Unusable) |

Residual Voice Capacity (2 bits): This is the ratio of available voice timeslots to the total voice timeslots in a channel. Using this information, the handset can disregard those channels that are low on available capacity. This is represented in the following table:

| Bit Combination | Interference Level |
| --- | --- |
| 00 | Very Low |
| 01 | Low |
| 10 | Medium |
| 11 | High (Unusable) |

Residual Data Capacity (2 bits): This is the ratio of available data timeslots to the total data timeslots in a channel. A data timeslot is used by a mobile device to transmit SIP registration messages before and during a voice session. Availability of data timeslots implies a higher probability of successful call establishment. This is represented in the following table:

| Bit Combination | Residual Data Capacity |
| --- | --- |
| 00 | 1% to 33% |
| 01 | 33% to 66% |
| 10 | 66% to 100% |
| 11 | 0 (Unusable) |

Percentage of registered handsets (2 bits): This is the ratio of the number of registered handsets to the maximum possible handset registrations. It allows the handset to skip the channel where the upper limit of registrations has been reached. It is represented in the following table:

| Bit Combination | % Registered handsets |
| --- | --- |
| 00 | 0% to 33% |
| 01 | 33% to 66% |
| 10 | 66% to 99% |
| 11 | 100% (Unusable) |

Note that if any of the above fields is set to 11 then the channel is usable by the handset. The handset uses the above information to shortlist a set of suitable channels that will be scanned proactively. It therefore does not have to scan all eighteen channels, thereby reducing the power consumption and leading to a more precise channel switch. This in turn leads to an increase in the probability of handoff success, making the system more robust in the presence of interference.

In summary interference in the 900 MHz ISM band might require an xMAX device to switch channels. A technique to reduce the channel switch latency is described. The technique involves transmission of channel-specific information in the beacon transmitted by the Base Station. The structure of the beacon and the parameters contained in it are explained. This information allows the handset to pre-select suitable channels to be scanned based on pre-existing channel conditions. As a result, the probability of success during channel switch increases and latency decreases. This leads to significant improvement in the ability of the mobile device to handle interference.

What is claimed is:

1. A method for base station assisted channel selection used to assist mobile node handset scanning and handoff between multiple base stations each having multiple channels and a medium access control protocol having timeslots for forwarding Internet Protocol packets between multiple base stations and mobile nodes in voice over the Internet protocol systems on a wireless network comprising:

multiple base stations in electrical communication with the Internet and each of said multiple base stations continuously measuring and calculating uplink channel conditions for every Internet Protocol packet received on each of said multiple channels by maintaining a running average of measured interference on each of said timeslots and if said running average of measured interference exceeds a set threshold said timeslot is categorized as unusable and said base station then calculating a percentage of unusable timeslots to total timeslots per channel;

one or more mobile nodes in wireless electrical communication with one of said multiple base stations using one of said multiple channels;

said multiple base stations and said one or more mobile nodes each having a medium access control protocol containing sequentially numbered periodically repeating hyperframes made up of a determined number of multiple sequentially numbered superframes equal to the number of channels on the wireless network wherein the position of one of each of said multiple superframes in each hyperframe identifies only one of each of said multiple channels;

each of said multiple base stations transmitting a beacon signal at the start of each said multiple superframes simultaneously on all of said multiple base stations' multiple channels;

said beacon signal containing a base station identifier, a channel identifier determined by a combination of the sequential number of said hyperframe and sequential number of said superframe containing the transmitted beacon signal, and channel information containing uplink channel interference information comprising the percentage of unusable timeslots to total timeslots, voice capacity, data capacity, and mobile node registration capacity percentage information; and, wherein each of said one or more mobile nodes within transmission range of each of said multiple base stations uses the base station identifier, the channel identifier, and channel information containing uplink channel interference information comprising the percentage of unusable timeslots to total timeslots, voice capacity, data capacity, and mobile node registration capacity percentage information contained in said beacon signal to continuously select and store a subset of said multiple channels such that said subset of said multiple channels is used by said mobile node to scan for downlink channel conditions prior to selecting a channel for handoff.

\* \* \* \* \*